Dec. 27, 1960 M. H. DUBOIS 2,966,554

AUTOMATIC TELEPHONE SYSTEM WITH PAGING EQUIPMENT

Filed Oct. 28, 1957 4 Sheets-Sheet 1

INVENTOR

MARTIN H. DUBOIS

BY Strauch, Nolan + Neale

ATTORNEYS

Dec. 27, 1960 M. H. DUBOIS 2,966,554

AUTOMATIC TELEPHONE SYSTEM WITH PAGING EQUIPMENT

Filed Oct. 28, 1957 4 Sheets-Sheet 2

INVENTOR
MARTIN H. DUBOIS

BY Strauch, Nolan + Neale
ATTORNEYS

Dec. 27, 1960 M. H. DUBOIS 2,966,554

AUTOMATIC TELEPHONE SYSTEM WITH PAGING EQUIPMENT

Filed Oct. 28, 1957 4 Sheets-Sheet 3

INVENTOR
MARTIN H. DUBOIS

BY Strauch, Nolan & Neale
ATTORNEYS

Dec. 27, 1960 M. H. DUBOIS 2,966,554
AUTOMATIC TELEPHONE SYSTEM WITH PAGING EQUIPMENT
Filed Oct. 28, 1957 4 Sheets-Sheet 4
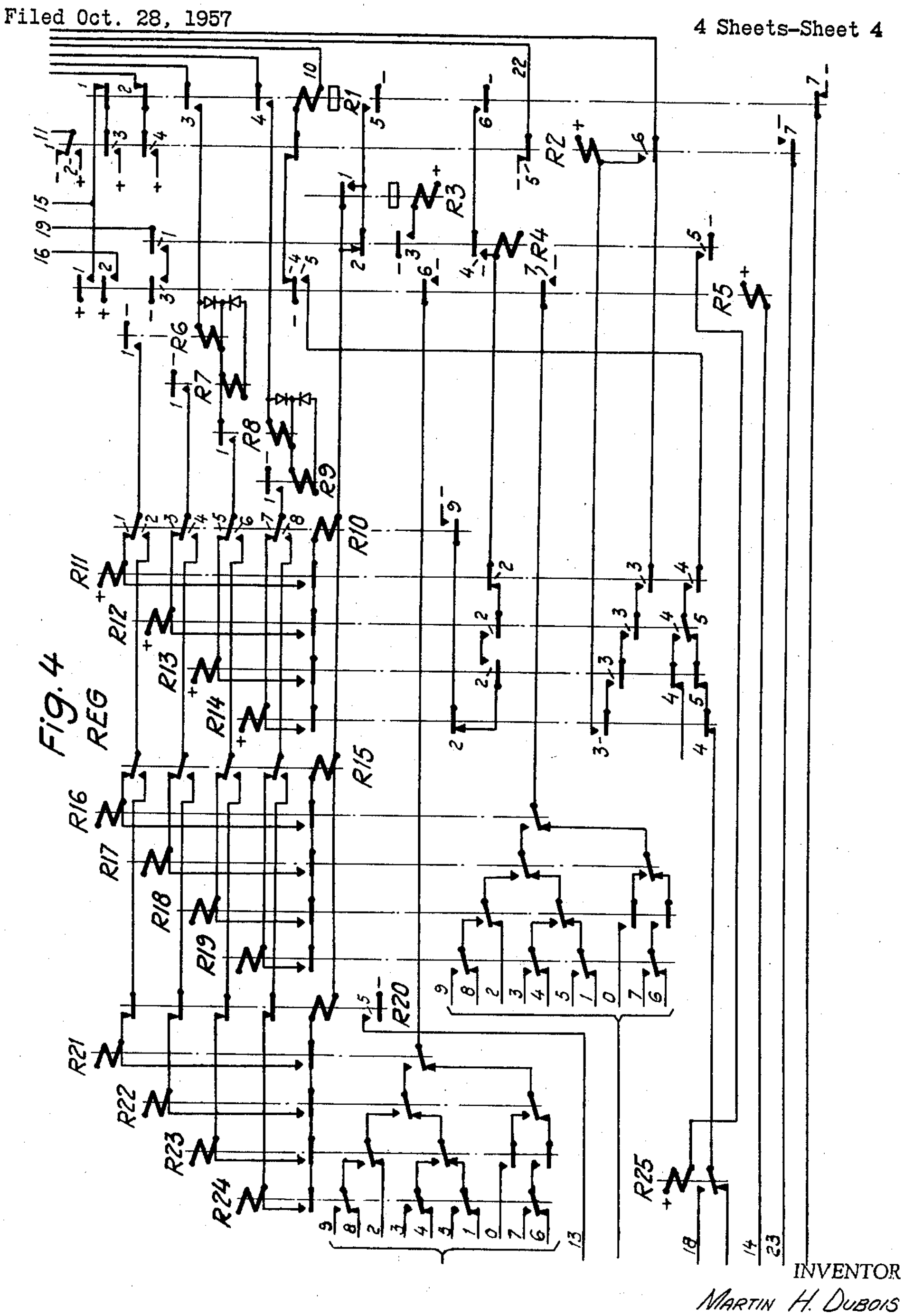
Fig. 4 REG
INVENTOR
MARTIN H. DUBOIS
BY Strauch, Nolan & Neale
ATTORNEYS

United States Patent Office 2,966,554

Patented Dec. 27, 1960

2,966,554

AUTOMATIC TELEPHONE SYSTEM WITH PAGING EQUIPMENT

Martin H. Dubois, Hagersten, Sweden, assignor to Svenska Relafabriken ABN AB, Tyreso, Sweden, a Swedish joint-stock company

Filed Oct. 28, 1957, Ser. No. 692,659

Claims priority, application Sweden Oct. 30, 1956

1 Claim. (Cl. 179—18)

The present invention relates to an automatic telephone system with paging facilities.

A paging system (also called "staff locator system") is a signalling system consisting of a number of optical indicators which are located at different places in offices and works, and which can be operated from the telephone exchange (private branch exchange or an exchange for an intercommunication system). Each indicator has a plurality of lamps which can be lighted in different combinations, and different lamp combinations are allocated to different persons, so that a person who is temporarily absent from his normal telephone instrument or has no telephone instrument of his own, can be signalled by means of the paging system when he is wanted on the telephone.

The present invention particularly relates to an automatic telephone system combined with a paging system in which a calling party can operate the paging system from his telephone instrument by first sending a special code signal which connects him with the paging equipment, and then sending code signals designating the called party, preferably code signals representing the number of the called party's telephone set, which signals cause the lamp combination allocated to the called party to light up on all lamp indicators. The called party can answer the call from any telephone instrument of the system by sending to the exchange a special code signal designating answer to a paging call.

The system to which the invention relates comprises a number of connecting links and switching means (line finders and final selectors) for connecting calling and called stations to connecting paths including the connecting links, the switching means being set by means of a common control equipment (marker, register) which is so designed that when a code signal initiating paging is received from a calling party, it causes seizure of a special code signal selector, which in response to subsequent signals designating the called party operates in known manner signalling means, for instance lamps in lamp indicators, for paging.

The main object of the invention is to provide an expedient cooperation between the equipment for establishing normal connections and the paging equipment, so that, in contradistinction to hitherto known systems, additional lines are not required for a connection which has been initiated by paging, and complicated and expensive relay sets for the storage of the numbers of the subscriber's stations are not required for the completion of the connection after a paging call.

The invention will be described more in particular in conjunction with the accompanying drawings which show schematically an automatic telephone system with paging facilities embodying the invention.

Figure 4 shows a register (REG).

Figures 1, 5:
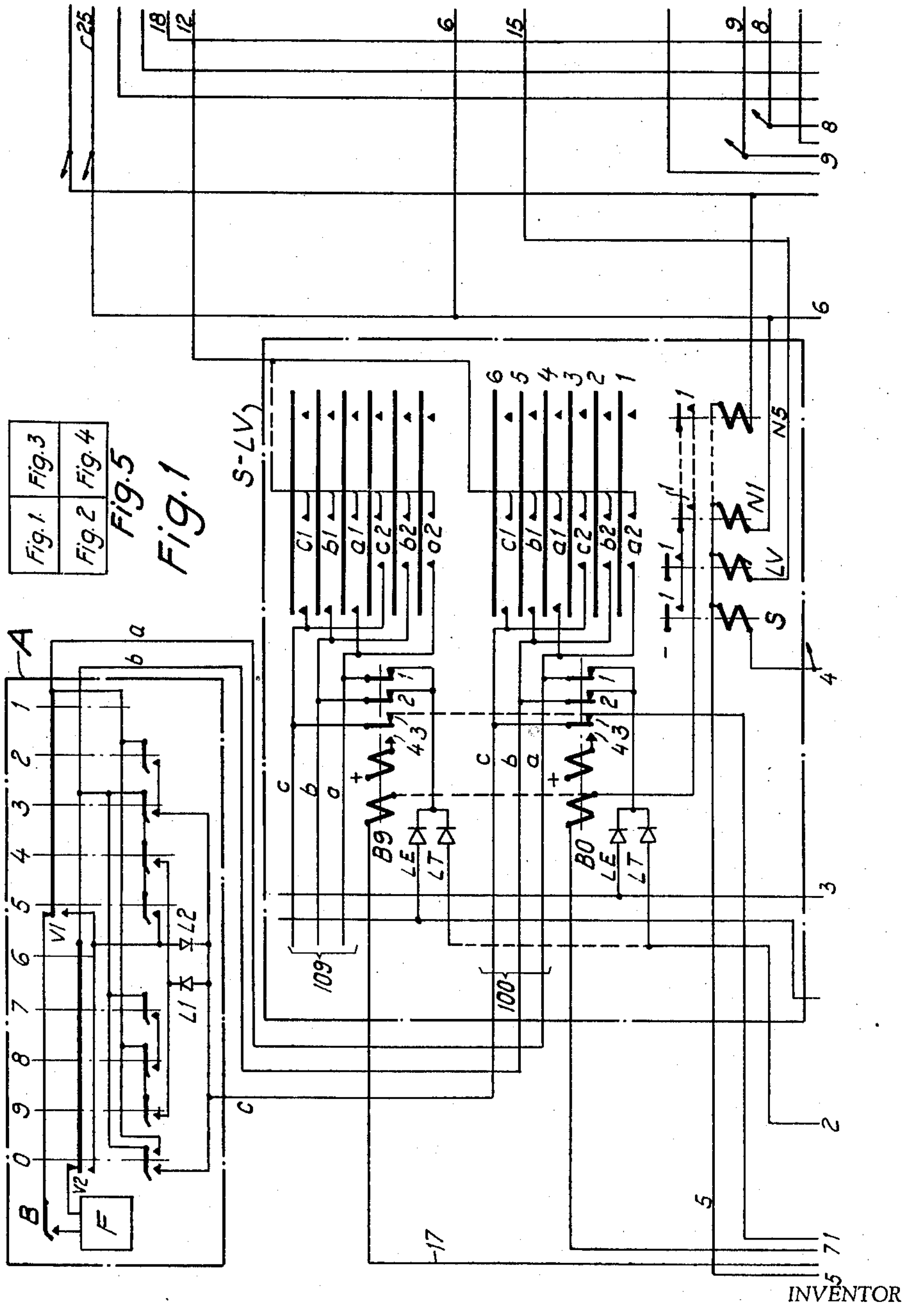
Figure 1 shows a subscriber's station (A) and a combined line finder and final selector (S—LV).
Figure 5 shows how Figures 1–4 should be placed in relation to one another to show the whole system.
Figure 2:
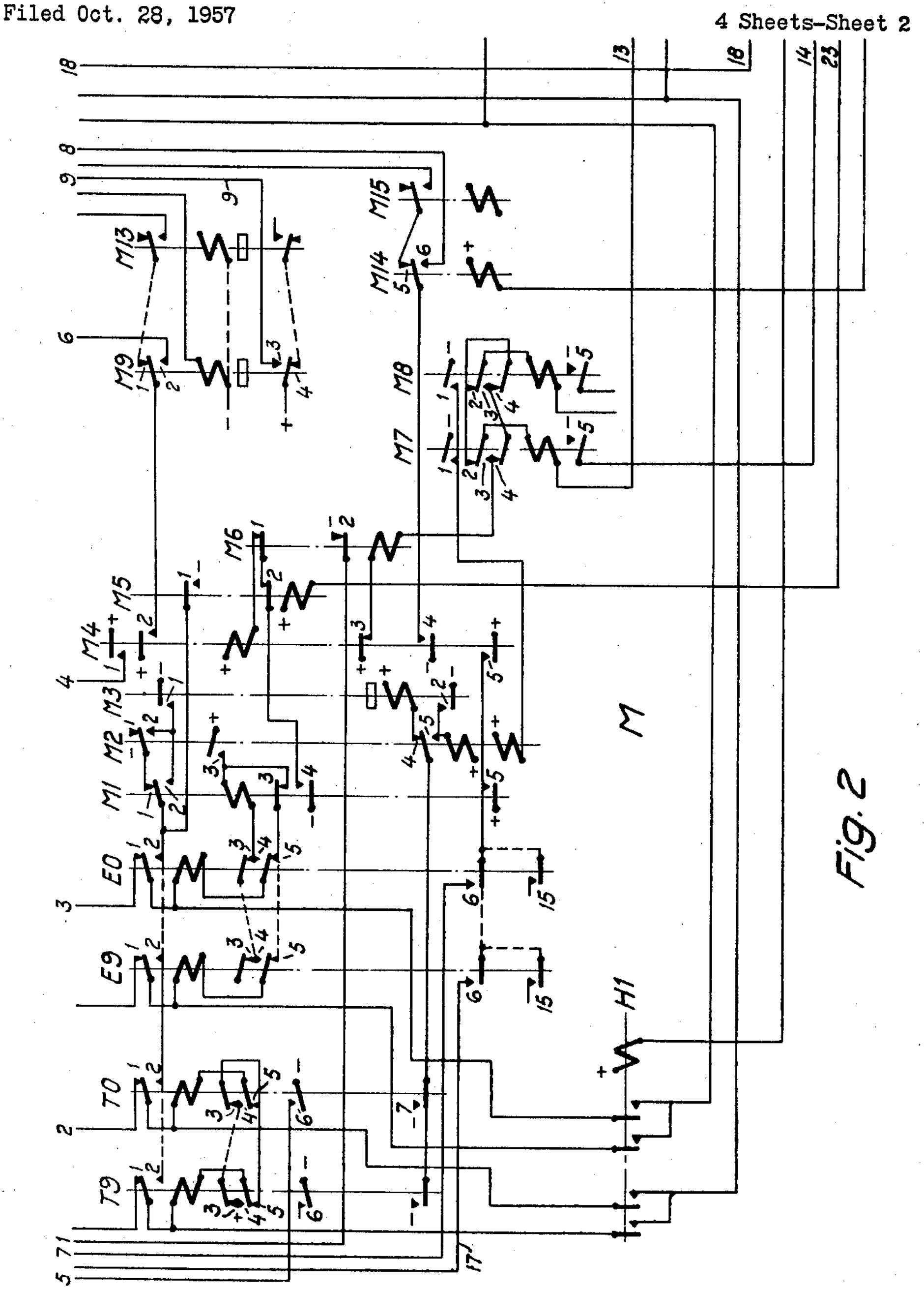
Figure 2 shows a marker (M).
Figure 3:
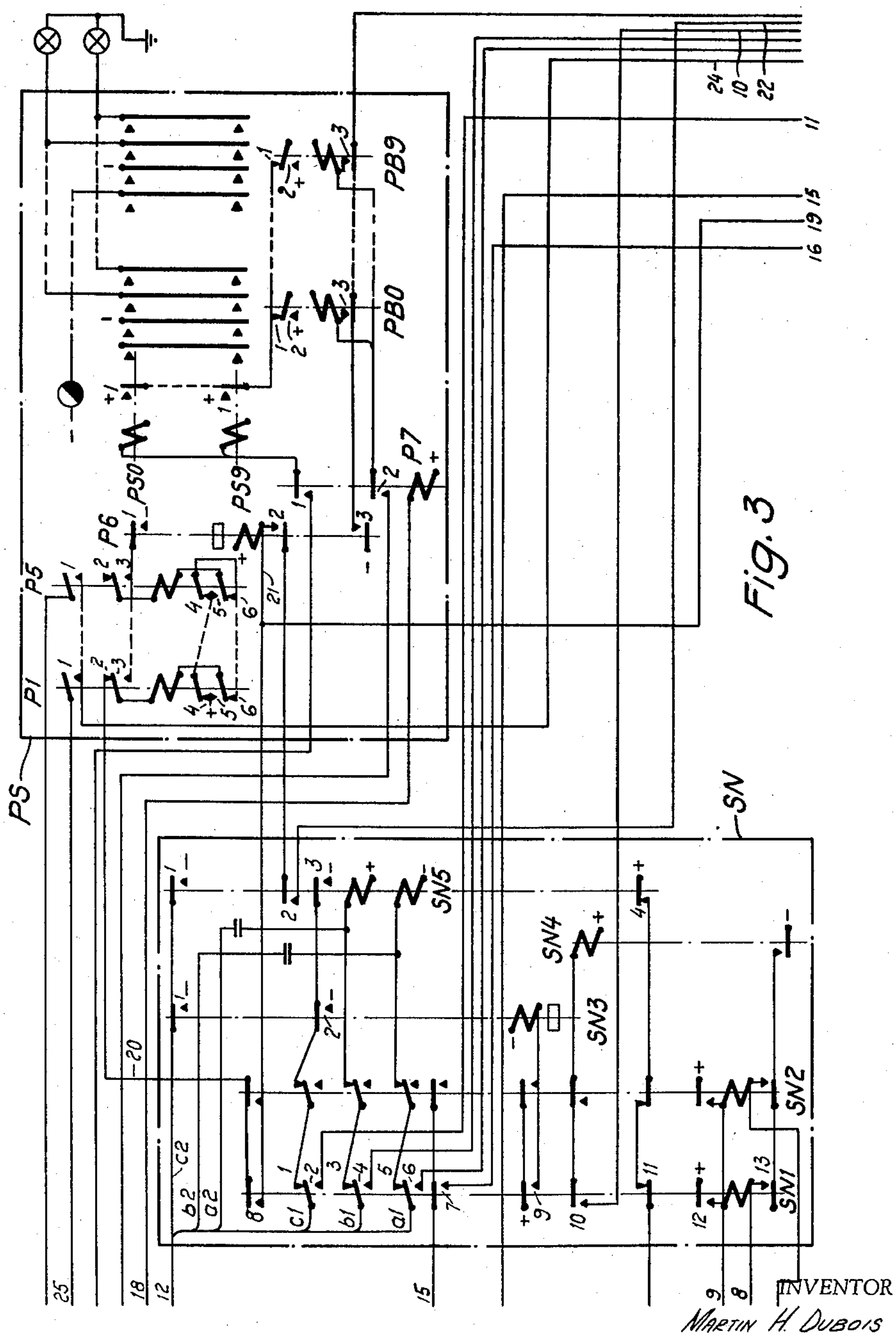
Figure 3 shows a connecting link relay set (SN) and a paging relay set (PS).

On the drawings only those parts are shown which are of importance for the understanding of the invention.

The subscriber's station A is provided with a keyset for code signal transmission. The contacts operated by the different keys are designated 1, 2 . . . 0. The keyset further comprises two change-over contacts V1 and V2 the first of which is operated when any of keys 1—5 is operated and the latter of which is operated when any of keys 6—0 is operated. The keyset also includes two rectifiers L1 and L2. How the various contacts and rectifiers are interconnected and connected to the outgoing line appears from the figure. The remaining parts of the subscriber's station are schematically represented on the figure by the box F.

The subscriber's stations are connected to line finder and final selector equipment S–LV, each subscriber's station having allocated thereto a bridge unit (holding bar) in a cross bar switch. The contact spring sets of each cross bar bridge unit are so disposed that the contact spring set indicated by selecting magnet S connects the subscriber's station to the incoming side of a connecting link and the contact spring set indicated by selecting magnet LV connects the subscriber's station to the outgoing side of the connecting link while the spring sets indicated by the other selecting magnets N1—N4 connect the connecting link.

The operation of the system is broadly as follows.

*Setting up a normal speech connection between two stations*

It is assumed that subscriber 100 wants to establish a connection to subscriber 109. The subscriber at the calling station calls the exchange by depressing key number 1 of his keyset, that is the key corresponding to the hundreds digit of the called subscriber's number. The number of the calling station is hereby indicated in the marker M. The line finder and final selector S—LV is operated in response to the indentification of the calling subscriber's number made by the marker and seizes a free connecting link. Then a register is seized for the reception of the transmitted code signal corresponding to the first digit of the number of the called subscriber. At the same time the marker is released. The calling subscriber then transmits the other digits of the number of the called subscriber, and these digits are stored in the register. After the register has received all the digits it seizes the marker if this is free, and transmits the digits to the indicating means in the marker. The marker then sets the line finder final selector to the called station. When the connection has been completed, the register and the marker are released and the two stations are now connected with each other over two bridge units in the line finder-final selector equipment and a connecting link. The connection is released by the calling subscriber operating his restoring key B whereby the connecting link relay set and the two bridge units in the line finder-final selector equipment are released.

*Setting up a paging call*

When paging is desired, the paging equipment PS is called by the calling subscriber sending a code number, for instance 0, followed by the number of the called subscriber. Identification, operation of the line finder and final selector equipment and connection to a register is effected in the same manner as when a normal connection is established. When digit 0 is received in the register a special relay is operated which indicates that paging is to be effected. The operation of this special relay results in the marking of the called subscriber's number being transferred from the marker to a code signal selector in the paging equipment. At the same time digit 0 is cancelled in the register. Then the number of the called subscriber is received in the same manner as in normal operation by the register which after the receipt of all digits sets the code signal selector on a lamp combination designating the called subscriber. The register and the marker are released as soon as the paging equipment has been operated. The calling subscriber is now connected over his bridge unit in the line finder-final selector equipment to the connecting link relay set and hereby keeps the paging equipment operated. The called person can now answer the call from any subscriber's station by sending from the station a predetermined code number, for instance 9, to be used for answering paging calls. The station from which the called party answers the call, is identified in the marker and the line finder-final selector equipment and is connected to the register in the same manner as in the case of an ordinary call. The code digit 9 is received in the register and causes the operation of a special relay which indicates answer to a paging call. The operation of this relay causes the marker to retain the identification of the number of the answering station. The operation of said special relay also causes the cross bar switch holding magnet of the answering station to release whereby the connecting link seized by this station is disconnected. The answering station is then connected to the connecting link seized by the station from which the paging call was originated. This is effected by the line finder-final selector being set according to the identification of the number of the answering station in the marker and also according to an indication in the paging equipment indicating the connecting circuit seized by the calling station. When the speech connection is completed, the marker, register and the paging equipment are released. The two stations are now connected with each other over the same circuits as in the case that the connection has been established in the ordinary manner.

*Detailed description of the operation*

In the following description the various contacts are designated by their reference number preceded by the designation of the member to which the contact belongs.

The establishment of a connection between for instance station number 100 and station number 109 is effected in the following manner.

The subscriber at station 100 depresses key 1 on his keyset. Hereby the following circuit is closed: negative pole—M6–2—wire 1—contact 3 on holding magnet B0—wire c—rectifier L1 in the subscriber's station—change-over contact V1—wire a—B0–2. The circuit here divides in two branches. The first branch includes rectifier LT—wire 2—T0–1—coil of T0—T0–5—T0–3—contacts 3 on all relays T1—T9—positive pole. The other branch includes rectifier LE—wire 3—E0–1—coil of E0—E0–5—M1–3—contact 3 on M2. The latter contact is not yet closed. When relay T0 is operated, the following circuit is closed: negative pole—T0–7—M2–4—coil of M3—positive pole. Relay M3 is operated and closes by its contact 2 an energizing circuit for relay M2 which then closes contact 3 so that the energizing circuit for relay E0 is closed. Relay M3 is slow-releasing and will therefore remain operated for a brief time after its energizing circuit has been broken at contact 4 of relay M2. When relay E0 is operated, relay M1 is energized over contact E0–4. Relays E0 and T0 are now held operated by current over M3–1 and M1–2. The operation of relay M1 causes the operation of relay M4 over M6–1—M5–2—M1–4—negative pole. When relay M4 is operated, the selecting magnet S is energized in the following circuit: positive pole—M4–1—wire 4—coil of magnet S—wire 5—T0–6—negative pole. The operation of relay M4 also causes the operation of one of the selecting magnets N1—N5 according to which connecting link is free. A free connecting link is marked by a corresponding relay in the call distributor M9—M13 being in operated condition. It is now assumed that the first connecting link is free and relay M9 operated, whereby the selecting magnet N1 will be operated in the following circuit: positive pole—M4–2—M9–2—wire 6—coil of magnet N1—wire 5—T0–6—negative pole. The operation of relay M4 further causes the operation of one of relays SN1—SN2 in the connecting link relay set. Relays SN1 and SN2 are register connecting relays and are operated only if a register is free. A free register is marked in the marker by a corresponding relay M14—M15 being in operated condition. It is now assumed that the first register is free and relay M14 is thus in operated condition. Relay SN1 will then receive energizing current in the following circuit: positive pole—M4–4—M14–6—wire 8—coil of SN1—wire 9—M9–3 positive pole.

When selecting magnet N1 is operated, the holding magnet B0 is energized in the following circuit: positive pole—M1–5—E0–6—wire 7—coil of B0–N1–1—S–1—negative pole. When holding magnet B0 is operated, the station 100 is connected to the register over contacts on relay SN1. The operation of relay SN1 caused the operation of relays SN4 and R1 in series in the following circuit: positive pole—coil of SN4—SN1–10—wire 10—coil of R1—R5–4—negative pole. Relay SN1 then receives holding current in the circuit: negative pole—SN4–1—SN1–13—coil of SN1—SN1–12—positive pole. The holding coil of holding magnet B0 receives current in the following circuit: positive pole—coil of B0—B0–4—wire c—contacts on bar 6—wire 12—wire c1—SN1–2—wire 11—R2–1—negative pole. The calling station is now connected over the *a* and *b* wires to the digit receiving relays R6—R9 in the register. Since the subscriber at the calling station still keeps key 1 depressed, the first digit in the called subscriber's number will be registered in relay set R6—R9. The coils of relays R6—R9 are connected to an alternating current source and are connected in parallel with rectifiers which are oriented as shown in the figure. Under cooperation with these rectifiers and rectifiers L1 and L2 in the keyset of the subscriber's station relays R6—R9 will be operated in different combinations according to which key in the keyset is depressed. When the first digit has been received by relays R6—R9, the corresponding relays in relay chain R11—R14 are energized. When the subscriber at the calling station releases the key, all the previously operated relays in relay chain R6—R9 are released, and those relays in relay chain R11—R14 which have been operated then receive holding current in series with the coil of relay R10—R4–2—R1–5—negative pole. Thus the relay chain R11—R14 stores the first digit of the number of the called subscriber. When the subscriber at the calling station depresses a key corresponding to the second digit in the called subscriber's number, this digit is received by relay chain R6—R9 and is transferred to corresponding relays in relay chain R16—R19 over contacts on the relay R10 which is now in operated condition. When the subscriber releases the key, those relays in relay chain R16—R19 which have been operated, receive holding current in series with the coil of relay R15. Thus, the second digit has been stored in relay chain R16—R19. The last digit of the called number is received and stored in similar manner in relay chain R21—R24.

When relay R20 is operated, the marker is called by the register. If the marker is free, relays M7 and M6 will be energized in series in the following circuit: negative pole—R20–5—wire 13—coil of M7—M7–2—M8–2—M8–4—M7–4—coil of relay M6—M4–3—positive pole. The operation of relay M7 causes the operation of relay R5 in the following circuit: negative pole—M7–5—wire 14—coil of relay R5—positive pole. When relay R5 is operated, a negative potential is extended by contacts R5-5, R5-6 and R5-7 over contacts in the relay chains R11—R14, R16—R19 and R21—R24. The negative potential extended over contacts on relay chain R11—R14 causes the operation of a hundreds relay, in this case relay H1 since the first digit was 1. When relay H1 is operated, the negative potentials over contacts in relay chains R16—R19 and R21—R24 will be extended to the tens relays T0 . . . T9 and units relays E0 . . . E9. Since the second and third digits in the called number were assumed to be 0 and 9 respectively, relays T0 and E9 will be operated. The operation of these relays is effected in a manner similar to that previously described.

When relay T0 is operated, selecting magnets LV and N1 receive energizing current in the following circuits: negative pole—T0-6—wire 5. For selecting magnet LV the circuit then extends over the coil of this magnet—wire 15—R15—positive pole. For selecting magnet N1 the circuit extends over the coil of this magnet—wire 6—SN-7—wire 16—R5-2—positive pole. The holding magnet of the called station is operated in the following circuit: positive pole—M1-5—E9-6—wire 17—coil of holding magnet B9—N1-1—LV-1—negative pole. The called station is now connected over its bridge unit in the cross bar switch to the connecting link relay set. When relay R5 was operated, the energizing circuits for relays R1 and SN4 were broken. When relay R1 which is slow-releasing, is released, the holding circuits for the storage relays in the register are broken. Hereby the marker will also be released. The holding of relays SN1 ceases when relay SN4 is released. The holding of the holding magnets of the calling and called stations is effected over contacts 1 and 2 on the slow-releasing relay SN3 until contacts on relays SN5 have closed. Relay SN5 is operated in series with the subscriber's apparatus equipment of the calling station. A speech connection has now been established between the calling and the called station, and in the exchange only relay SN5 and the two holding magnets B0 and B9 are in operated condition.

Release of the connection is effected by the calling subscriber operating his restoring key B whereby relay SN5 and the holding magnets are released.

As mentioned above a call to the paging equipment is effected by sending a special code signal, in this case digit 0. The call, the identification and connection to a register then proceeds in the manner previously described. The digit 0 which is stored in the register in relay chain R11—R14, causes the operation of a special code relay R4. Relay R4 receives holding current in the following circuit: negative pole—R1-6—R4-4—coil of R4—positive pole. The operation of relay R4 causes the operation of relay R25 in the circuit: negative pole—R4-5—coil of R25—positive pole. Hereby the hundreds marking is transferred to the paging equipment. The operation of relay R4 also causes the cancellation of digit 0 from relay chain R11—R14. Relay R3 which is slow-operating, again prepares holding circuits for the digit storage relay chains. The calling subscriber then transmits the digits of the number of the called person, and these digits are stored in the register in the manner previously described. When all the digits have been received relays R20, M7 and R5 will be operated in the manner previously described. When relay R5 is operated, the hundreds relay P7 in the paging equipment receives energizing current. Then the holding magnets PB and the selecting magnets PS of a crossbar switch will be set in accordance with the tens and units digits received by the register. The operation of relay R5 also causes the operation of relays P1 and P6 in the paging equipment. Relay P1 is energized in the following circuit: negative pole—R5-3—R4-1—wire 19—SN1-8—wire 20—P1-2—coil of P1—P1-6—contacts 4 of relays P1-P5—positive pole. Relay P6 is energized in the same circuit up to wire 19 and then over wire 21—coil of P6—positive pole. Relay P6 receives holding current in the following circuit: positive pole—coil of P6—P6-2—SN5-2—wire 22—R2-5—negative pole. Hereby the paging equipment will be kept engaged either till the calling subscriber releases the connection or till the paged person answers the call. That one of relays P1—P5 which is in operated condition indicates which connecting link has been engaged for the paging call.

The register, the marker and the register connecting relay in the connecting link will be released in the manner previously described when the slow-operating relay R1 and relay SN4 are released. The calling station now keeps the connecting link engaged, whereby the paging equipment is also kept engaged.

It is now assumed that the paged person answers the call by sending from any station a special code number, for instance 9, for answering paging calls. Identification and registering of this answering call is effected in the manner previously described. When digit 9 is received in relay chain R11—R14 in the register, a code relay R2 will be operated. When relay R2 is operated the holding magnet of the answering station will be shunted by a positive potential being extended over contact R2-2—wire 11—SN1-2 and the previously described circuit to the holding magnet. The connecting link seized by the answering station is then released. The operation of relay R2 also causes the operation of relay M5 in the circuit R2-7—wire 23—coil of M4—positive pole. Due to the operation of relay M5 the marker identification of the number of the answering station is retained in the marker. This is effected by a negative potential applied over contact M5-1. When relay R1 is released, a selecting magnet N in the line finder-final selector equipment will be operated corresponding to that of relays P1—P5 which is operated according to the connecting link seized by the paging call. If it is assumed that the paging call has seized connecting link 1, the selecting magnet N1 will be operated in the following circuit: positive pole: R2-4—R1-2—wire 24—R1-1—wire 25—wire 6—coil of selecting magnet N1—wire 5—P0-6—negative pole. The final selector selecting magnet LV is energized in the same circuit as previously described up to wire 15 and then over R1-1—R2-3—positive pole. The holding magnet for the answering station is operated in the manner previously described under the control of the units relays in the marker. After the slow-operating relay P6 has released the whole paging equipment is released. Hereby relay R2 which was held by relay P6, is released and breaks the holding circuit for relay M5 in the marker which is thereby released. The two stations are now interconnected in the same manner as in the case of an ordinary connection.

What I claim is:

An automatic telephone system comprising a number of stations having signal sending means, lines connecting said stations with an automatic exchange, said exchange including a plurality of connecting links, switching means for establishing connections between calling and called stations over said connecting links, and common control means for controlling the operation of said switching means, a paging system connected to said exchange and having indicators with signalling means operable in various combinations, different combinations being allotted to different persons to be called by paging, a code signal selector for operating said signalling means, said common control means being responsive to a predetermined signal from a calling station to seize said code signal selector and responsive to subsequent signals indicating the called person to cause the code signal selector to operate said signalling means in the combination allotted to the called person, switching means in the paging system responsive to said predetermined signal to identify the connecting link seized by the calling station, means for retaining said switching means and said code signal selector in operated condition till the call is either answered or abandoned, means for releasing said common control means when the setting of said code signal selector and said switching means in the paging system is completed, means in said common control means responsive to a signal indicating answer to a paging call to release the connecting link seized by the answering station, to cause holding of identification means in the common control means identifying the answering station, and to cause extension of the connection from the calling station to the answering station under the control of said identification means and said switching means in the paging system.

References Cited in the file of this patent

UNITED STATES PATENTS

| | | |
|---|---|---|
| 2,727,947 | Nilsson | Dec. 20, 1955 |
| 2,740,842 | Schneider et al. | Apr. 3, 1956 |
| 2,764,632 | Adler | Sept. 25, 1956 |
| 2,848,550 | Pharis | Aug. 19, 1958 |